(12) United States Patent
Kern et al.

(10) Patent No.: US 9,290,197 B2
(45) Date of Patent: Mar. 22, 2016

(54) PLUG-ON BODY FOR A CLAMPING BOLT

(71) Applicant: THYSSENKRUPP PRESTA AKTIENGESELLSCHAFT, Eschen (LI)

(72) Inventors: Juergen Kern, Buerglen (CH); Markus Domig, Bartholomaeberg (AT); Hans Haugg, Unterterzen (CH); Michael Leitgeb, Mauren (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/388,029

(22) PCT Filed: Feb. 14, 2013

(86) PCT No.: PCT/EP2013/000424
§ 371 (c)(1),
(2) Date: Sep. 25, 2014

(87) PCT Pub. No.: WO2013/143635
PCT Pub. Date: Oct. 3, 2013

(65) Prior Publication Data
US 2015/0027263 A1   Jan. 29, 2015

(30) Foreign Application Priority Data
Mar. 26, 2012 (DE) .......................... 10 2012 102 556

(51) Int. Cl.
*B62D 1/184* (2006.01)
*B62D 1/187* (2006.01)

(52) U.S. Cl.
CPC ................ *B62D 1/187* (2013.01); *B62D 1/184* (2013.01)

(58) Field of Classification Search
CPC ................................ B62D 1/184; B62D 1/187
USPC ............................................ 74/493; 280/775
See application file for complete search history.

(56) References Cited

U.S. PATENT DOCUMENTS

| 5,088,767 | A | | 2/1992 | Hoblingre et al. |
| 5,394,676 | A | | 3/1995 | Lerner et al. |
| 5,394,767 | A | * | 3/1995 | Hoblingre et al. .............. 74/493 |
| 5,503,431 | A | | 4/1996 | Yamamoto |
| 5,596,907 | A | | 1/1997 | Barton |
| 5,598,741 | A | | 2/1997 | Mitchell et al. |

(Continued)

FOREIGN PATENT DOCUMENTS

| DE | 31 38 083 | 6/1982 |
| DE | 197 18 031 | 4/1997 |

(Continued)

OTHER PUBLICATIONS

International Search Report issued May 13, 2013 in corresponding International Application No. PCT/EP2013/000424.

(Continued)

*Primary Examiner* — Karen Beck
(74) *Attorney, Agent, or Firm* — Wenderoth, Lind & Ponack, L.L.P.

(57) ABSTRACT

A plug-on body for a clamping bolt of an adjustable steering column for a motor vehicle. The plug-on body includes at least one opening for guiding the clamping bolt through the opening of the plug-on body and at least one or two damped elongated hole stops for damping an impact of the clamping bolt on an end of an elongated hole.

10 Claims, 4 Drawing Sheets

(56) References Cited

U.S. PATENT DOCUMENTS

Figure 1:
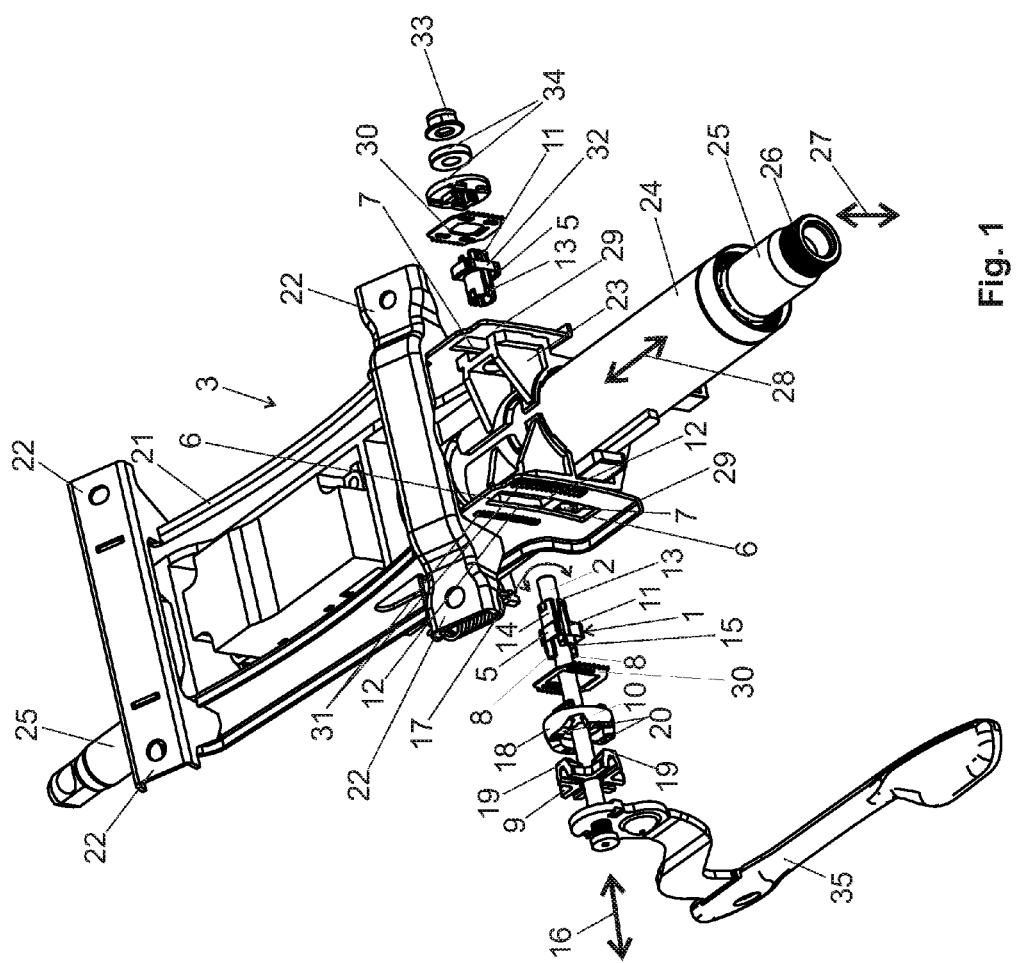

| | | | |
|---|---|---|---|
| 5,787,759 | A | 8/1998 | Olgren |
| 6,089,780 | A | 7/2000 | Lutz |
| 6,092,957 | A | 7/2000 | Fevre et al. |
| 6,095,012 | A | 8/2000 | Lutz |
| 6,173,822 | B1 | 1/2001 | Korb et al. |
| 6,860,669 | B2 | 3/2005 | Laisement et al. |
| 7,010,996 | B2 | 3/2006 | Schick et al. |
| 7,717,011 | B2 * | 5/2010 | Hirooka .......... 74/493 |
| 8,997,602 | B2 | 4/2015 | Tanaka |
| 2002/0062518 | A1 | 5/2002 | Hellwig et al. |
| 2002/0171235 | A1 * | 11/2002 | Riefe et al. .......... 280/775 |
| 2003/0221505 | A1 * | 12/2003 | Schick et al. .......... 74/493 |
| 2005/0178231 | A1 | 8/2005 | Schick et al. |
| 2006/0272219 | A1 * | 12/2006 | Carter et al. .......... 49/503 |
| 2006/0273567 | A1 | 12/2006 | Fix |
| 2008/0143092 | A1 | 6/2008 | Menjak et al. |
| 2008/0185829 | A1 | 8/2008 | Senn |
| 2008/0229867 | A1 | 9/2008 | Waibel et al. |
| 2009/0013817 | A1 | 1/2009 | Schnitzer et al. |
| 2009/0020995 | A1 | 1/2009 | Kim |
| 2011/0064538 | A1 | 3/2011 | Oertle et al. |
| 2011/0156380 | A1 | 6/2011 | Dietz et al. |
| 2011/0290605 | A1 | 12/2011 | Krawczyk et al. |
| 2012/0144953 | A1 | 6/2012 | Schnitzer |
| 2012/0285286 | A1 | 11/2012 | Schnitzer et al. |
| 2013/0104688 | A1 | 5/2013 | Okada et al. |
| 2013/0174684 | A1 | 7/2013 | Burns |

FOREIGN PATENT DOCUMENTS

| | | |
|---|---|---|
| DE | 695 00 927 | 4/1998 |
| DE | 198 05 289 | 8/1998 |
| DE | 197 45 038 | 7/1999 |
| DE | 696 10 067 | 4/2001 |
| DE | 100 51 805 | 5/2002 |
| DE | 102 25 089 | 1/2003 |
| DE | 101 61 849 | 6/2003 |
| DE | 10 2006 024 749 | 12/2006 |
| DE | 10 2005 052 123 | 1/2007 |
| DE | 10 2005 043 988 | 3/2007 |
| DE | 10 2005 045 365 | 3/2007 |
| DE | 20 2005 021 095 | 5/2007 |
| DE | 10 2007 003 091 | 8/2008 |
| DE | 10 2008 011 618 | 7/2009 |
| DE | 10 2008 028 460 | 12/2009 |
| DE | 10 2008 024 405 | 1/2010 |
| DE | 10 2008 045 143 | 3/2010 |
| DE | 10 2009 055 973 | 6/2011 |
| DE | 10 2010 029 252 | 12/2011 |
| DE | 10 2011 054 196 | 12/2012 |
| EP | 0 592 278 | 4/1994 |
| EP | 0 600 700 | 6/1994 |
| EP | 0 782 951 | 7/1997 |
| EP | 0 802 104 | 10/1997 |
| EP | 1 110 843 | 6/2001 |
| EP | 1 747 967 | 1/2007 |
| EP | 1 795 425 | 6/2007 |
| EP | 1 870 309 | 12/2007 |
| EP | 2 003 364 | 12/2008 |
| EP | 2 431 257 | 3/2012 |
| FR | 2 802 166 | 6/2001 |
| FR | 2 822 782 | 10/2002 |
| FR | 2 834 680 | 7/2003 |
| GB | 2 087 808 | 6/1982 |
| JP | 02-092779 | 4/1990 |
| JP | 2000-016303 | 1/2000 |
| JP | 2005-193745 | 7/2005 |
| JP | 2008-230452 | 10/2008 |
| JP | 2010-184656 | 8/2010 |
| WO | 96/15931 | 5/1996 |
| WO | 2007/009576 | 1/2007 |
| WO | 2009/105798 | 9/2009 |
| WO | 2011/020538 | 2/2011 |
| WO | 2012/011424 | 1/2012 |
| WO | 2013/050095 | 4/2013 |
| WO | 2013/071317 | 5/2013 |
| WO | 2013/097922 | 7/2013 |
| WO | 2013/107486 | 7/2013 |
| WO | 2013/143635 | 10/2013 |

OTHER PUBLICATIONS

International Search Report issued Mar. 19, 2013 in International (PCT) Application No. PCT/EP2012/005194.

International Search Report issued Sep. 12, 2012 in International (PCT) Application No. PCT/AT2012/000143.

* cited by examiner

PLUG-ON BODY FOR A CLAMPING BOLT

The present invention relates to a plug-on body for a clamping bolt of an adjustable steering column for a motor vehicle, wherein the plug-on body comprises at least one opening for guiding the clamping bolt through the opening of the plug-on body and at least one or two damped elongated hole stops for damping an impact of the clamping bolt on an end of an elongated hole.

Adjustable steering columns are steering columns that are adjustable for the purpose of adapting the position of the steering wheel to the particular motor vehicle driver. The steering columns known from prior art are predominantly fabricated of metal. The clamping bolt is a part of a securement device or a clamping system of the steering column. In the opened position of the securement device or the clamping system the steering column is adjustable. In the closed position of the securement device or the clamping system the steering column is fixed for normal operation, thus for the driving of the motor vehicle.

In prior art the adjustment processes of the steering column frequently entail considerable noise development since metal parts of the steering column grate along one another or impact on one another in the end positions.

DE 101 61 849 B4 discloses a generic plug-on body for a clamping bolt of such an adjustable steering column, which serves for damping the impact of the clamping bolt when it reaches the end positions in elongated holes in which the clamping bolt is guided.

It is furthermore also known in prior art to equip the above named securement device or clamping system with two cam carriers turnable against one another, wherein during the turning of the cam carriers against one another a stroke in the longitudinal direction of the clamping bolt is generated through the sliding-along of the cams of the two cam carriers, which stroke serves for the displacement of the securement device or the clamping system between the open position and the closed position. During the turning of the two cam carriers against one another noise also occurs.

The invention addresses the problem of providing a simply implementable feasibility for being able to further reduce the noise development in the steering column during the adjustment processes.

This is attained according to the invention through a plug-on body. The problem is furthermore resolved through a steering column according to the invention. The generic plug-on bodies described herein may be developed to the effect that they comprise, in addition, at least one cam carrier damper for damping a turning movement between a first cam carrier of the steering columns and at least one further cam carrier of the steering column.

This cam carrier damper acts preferably at least during the opening movement of the securement device or of the clamping system, thus during a movement starting from the closed position of the securement device or of the clamping system toward its open position in which an adjustment of the steering column is possible. It is understood that the cam carrier damper can also act, additionally or exclusively, during the opposite closing movement.

It is in any case advantageous for the cam carrier damper to serve for damping an end impact of the turning movement between the first cam carrier of the steering column and the at least one further cam carrier of the steering column. However, alternatively or additionally, the cam carrier damper can also develop its damping effect even before reaching the end position or before the end stop, thus during the turning of the cam carriers relative to one another.

In terms of low-noise guidance of the clamping bolt in the elongated hole of the adjustable steering column, it is also possible that the plug-on body comprises additionally one or several guidance faces for sliding along on one side wall of the elongated hole. Moreover, in terms of a plug-on body that is as multifunctional as possible, it can also be provided for the plug-on body to comprise at least one stroke end stop for delimiting a shifting movement of the plug-on body along the clamping bolt. In this case the stroke end stop can be implemented, for example, as a portion of a resilient tongue. To fix the plug-on body on one of the cam carriers, the plug-on body can provide an appropriate fixing means. In this context some embodiments may provide that it comprises one or several detents on the cam carrier for the plug-on body to snap into one of the cam carriers. In the case of steering columns in which the clamping bolt is not only guided in one but in two elongated holes, most often disposed cross-wise with respect to one another, the plug-on body can comprise elongated hole end stops for damping the particular impact of the clamping bolt on all ends, as is known per se within the above stated prior art. The plug-on body can accordingly also comprise guidance faces for sliding along on the side walls of both elongated holes.

Preferred embodiments of the invention provide for the plug-on body to be implemented entirely or at least partially of synthetic material. This can also be a multicomponent body of different synthetic materials. The use of elastomeric synthetic materials in order to attain an especially good damping effect is advantageous in any case. The plug-on body can include synthetic material or be entirely comprised thereof. The plug-on body can be unitary and be fabricated, for example, using an injection molding method, if appropriate, using multicomponent injection molding.

Apart from the plug-on body per se, the invention also relates to an adjustable steering column for a motor vehicle, with at least one clamping bolt and at least one plug-on body, wherein the clamping bolt is guided through the opening of the plug-on body and the elongated hole end stop or stops is or are disposed in an elongated hole of the steering column and the cam carrier damper is disposed and/or acts between a first cam carrier of the steering column and at least one further cam carrier of the steering column. The plug-on body can be supported displaceably in the longitudinal direction of the clamping bolt thereon. This applies at least until the above described stroke end stop is reached, should such be provided. However, alternatively or also additionally, the plug-on body can be supported such that it is turnable on the clamping bolt in its circumferential direction. Embodiments of adjustable steering columns according to the invention provide for the first cam carrier and/or the further cam carrier to comprise cams disposed in an annulus and cooperating with one another, and the cam carrier damper or the cam carrier dampers is or are disposed within the annulus.

Figure 2:
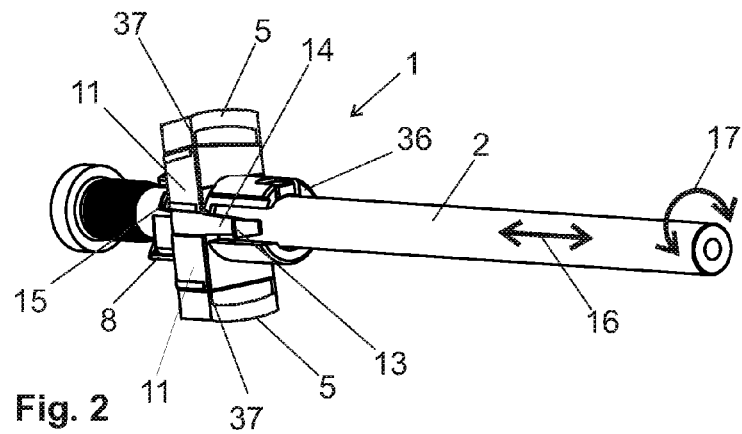
Figure 3:
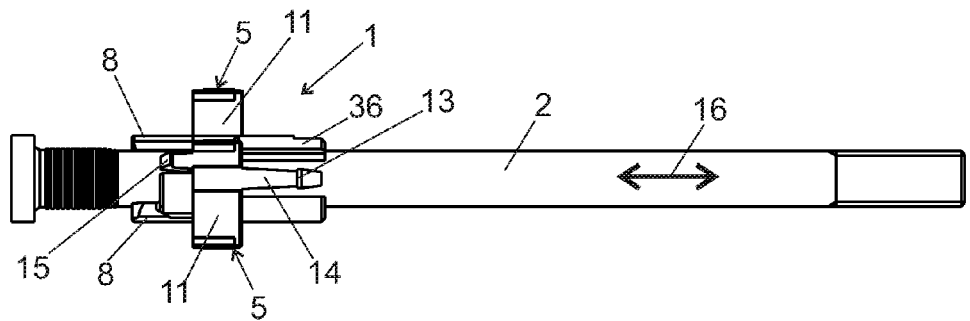
Figure 4:
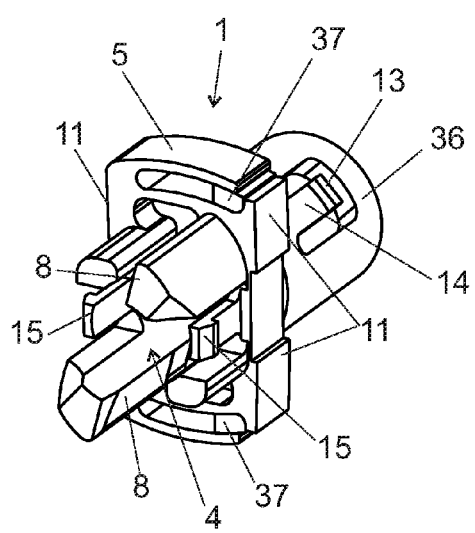
Figure 5:
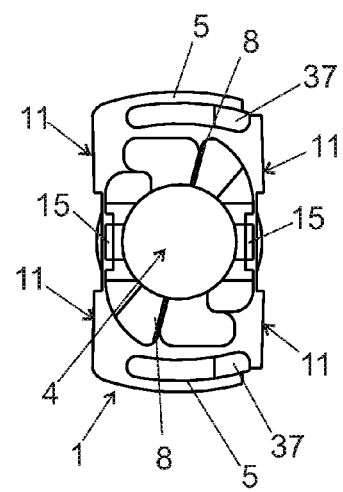
Figure 6:
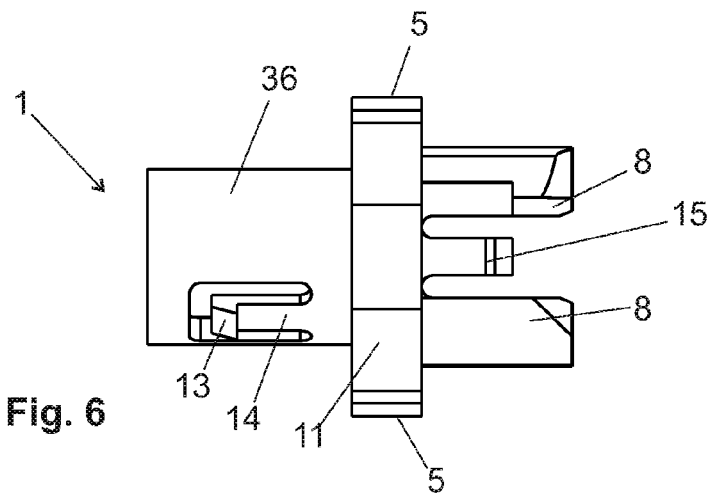
Figure 7:
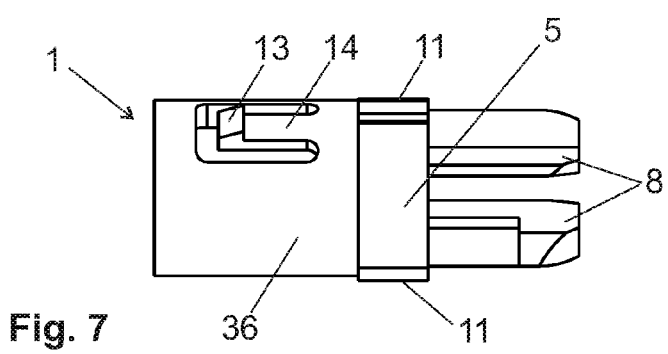
Figure 8:
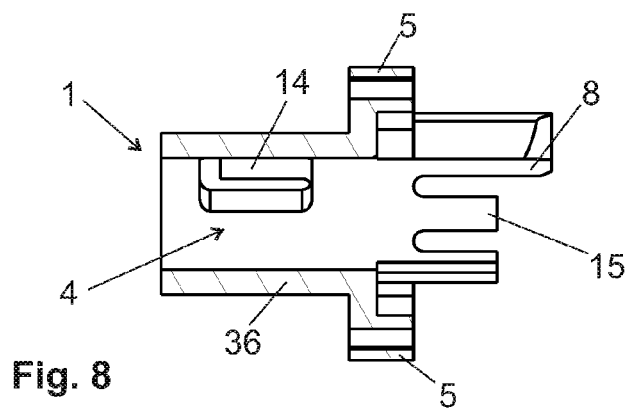
Figure 9:
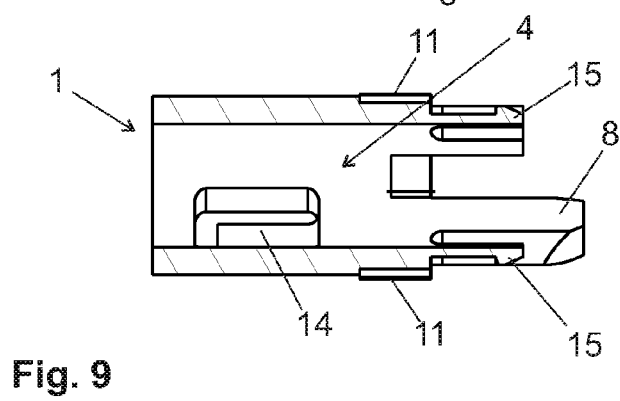
Figure 10:
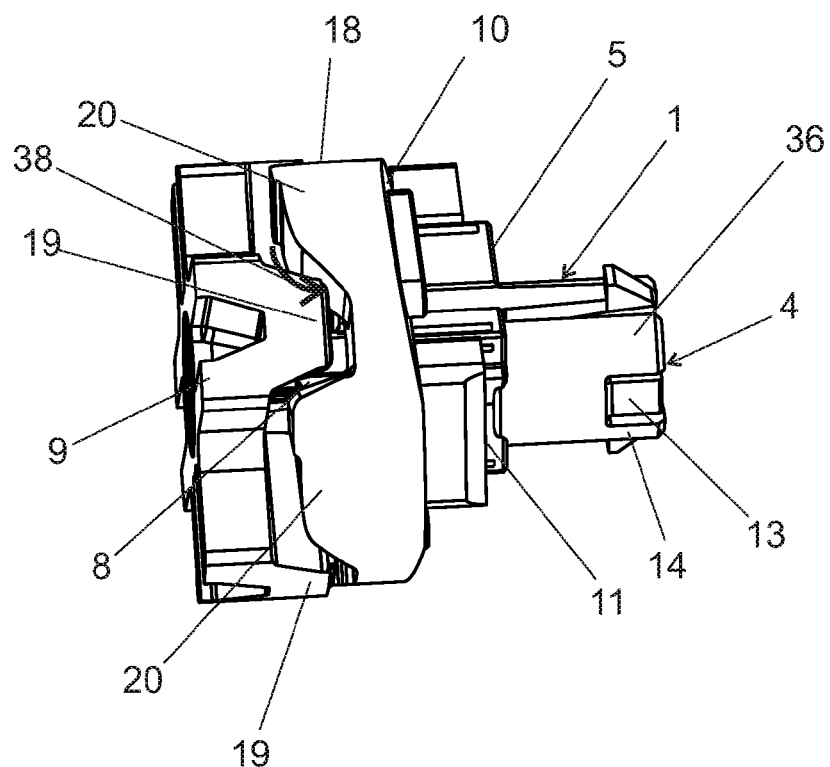
Figure 11:
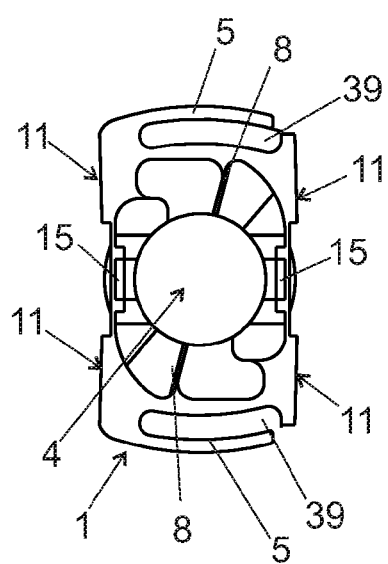

Further features and details of preferred embodiments of the invention will be described by example in the following in conjunction with an embodiment example according to the invention. In the drawing depict:

FIG. 1 an adjustable steering column for a motor vehicle according to the invention;

FIGS. 2 and 3 the plug-on body according to the invention of the steering column according to FIG. 1 with guided-through clamping bolt in perspective view (FIG. 2) and in side view (FIG. 3);

FIG. 4 a perspective view of the plug-on body;

FIG. 5 a front view of the plug-on body;

FIG. 6 a side view of the plug-on body;

FIG. 7 a top view of the plug-on body;

FIG. 8 a longitudinal section view of the plug-on body;

FIG. 9 a horizontal section view of the plug-on body;

FIG. 10 a depiction regarding the cooperation of the cam carrier damper and the cam carriers of this steering column, and FIG. 11 a depiction of an alternative embodiment of the plug-on body according to the invention.

In conjunction with FIG. 1, first, the features known per se from prior art realized in this embodiment example of a steering column 3 according to the invention will be described. The adjustable steering column 3 comprises a bracket part 21 that can be fixed via securement plates 22 on the body of the motor vehicle in order to retain the steering column 3 in the body of the motor vehicle. The steering spindle 25, on the steering wheel adapter 26 of which the steering wheel can be secured, is supported in the steering spindle bearing unit 24 such that it is rotatable about its longitudinal axis. The steering spindle bearing unit 24 is supported on the bracket part 21 by interposing an intermediate leverage 23. In the open state of the securement device, which will be described in detail below, of this embodiment example the steering spindle bearing unit can be shifted in the longitudinal direction 28 of the steering spindle 25 in the intermediate leverage 23. For a length adjustment of the steering column 3, the steering spindle 25 can hereby be displaced with its steering wheel adapter 26 in longitudinal directions 28 relative to the bracket part 21 and therewith to the body of the motor vehicle. For a height adjustment in the height directions 27 the steering spindle 25, together with the steering spindle bearing unit 24 and intermediate leverage 23, is swiveled relative to the bracket part 21 and therewith relative to the vehicle body. The swivel movement takes place as is known per se about a swivel joint, not shown in detail here, with which the intermediate leverage 23 is secured on the bracket part 21. This adjustment, known per se, of the steering column 3 of the motor vehicle is only possible if the securement device is in its open state. In the closed state of the securement device the steering spindle bearing unit 24 is fixed in its position relative to the bracket part 21 and therewith to the vehicle body. This applies at least as long as only forces occurring during normal operation act onto the steering column 3. In the event of a crash, thus in the case of an accident, it is known to allow in such steering columns 3 for the specific energy consumption a shift of the steering spindle bearing unit 24 relative to the bracket part 21 even in the closed state of the securement device. It should be pointed out in this connection that steering columns 3 according to the invention can be equipped not only with diverse implementations of securement devices, which can also differ from the embodiment example described here, but also with energy absorption mechanisms known in prior art.

In the depicted embodiment example according to FIG. 1 the bracket part 21 comprises two side jaws 29 between which the intermediate leverage 23, and therewith also the steering spindle bearing unit 24, is disposed. In each of the side jaws 29 is located an elongated hole 7 through which the clamping bolt 2 is guided. On the clamping bolt are located, as is known per se, the manual operating lever 35 of the securement device, the first cam carrier 9 connected non-rotatably therewith as well as the further cam carrier 10 connected non-rotatably with one of the side jaws 29. In order to effect a stroke in the longitudinal direction 16 of the clamping bolt 2 during the swiveling of the manual operation lever 35, the cams 19 of the first cam carrier 9 slide along the cams 20 of the further cam carrier 10. This is known per se in a multiplicity of implementations. Through an appropriate outforming of the cams, the forces occurring during this opening or closing movement can be highly precisely preset as a function of angle.

On the side facing away from the manual operating lever 35, the clamping bolt 2 is stayed on the opposing side jaw 29 by means of shimming washers 34 and a nut 33. In this embodiment example the clamping bolt 2 is further guided on both sides through interlocking toothed plates 30. These interlocking plates 30 in the depicted embodiment example serve in cooperation with the toothed racks 31, disposed on the side jaws 29, for a form-closure locking of the securement device in its closed position. In the depicted embodiment example the interlocking plates 30 comprise resilient regions which, in the open state of the securement device, lift them out of the particular toothed racks 31 such that a height adjustment in the height direction 27 is possible. With respect to the longitudinal directions 28, the steering spindle bearing unit 24 can be securable in the intermediate leverage 23 purely under friction closure. However, between the intermediate leverage 23 and the steering spindle bearing unit 24 corresponding toothings can also act such that retention under form closure is also possible. It is understood that the securement device, alternatively to the embodiment example shown here, can also be implemented such that it clamps under friction closure in the height direction 27 also. In the depicted embodiment example the securement device comprises the clamping bolt 2, the manual operating lever 35, the toothings and all structural components plugged onto the clamping bolt 2. By the corresponding swiveling of the manual operating lever 35 the clamping bolt of this embodiment example, together with the manual operating lever 35 and the cam carrier 9 non-rotatably secured thereon, is rotatable in the circumferential directions 17. The stroke in the longitudinal directions 16 of the clamping bolt 2 is, as stated, attained via the cooperation of the cam carriers 9 and 10. The cam carrier 10 of this embodiment example is developed in the form of an annulus 18.

In order to avoid undesirable noise development during the turning of the clamping bolt 2 in its circumferential direction 17 and also during the shifting of the clamping bolt along the elongated holes 7, in the variant according to FIG. 1 shown by example a plug-on body 1 is provided through the opening 4 of which the clamping bolt 2 is guided. The plug-on body 1 is once again depicted more clearly in the subsequent Figures. However, at this point reference is made to the fact that the plug-on body 1 is supported such that it slides with its guidance faces 11 on the side walls 12 of the elongated holes 7. Through these guidance faces 11 is attained, on the one hand, a clean guidance of the clamping bolt 2 in the elongated hole 7. On the other hand, however, noise due to friction during this shifting movement is also avoided. In order to avoid impact noise upon reaching the ends 6 of the elongated holes 7, the plug-on body 1 comprises the damped elongated hole end stops 5. To avoid noise development during the turning of the two cam carriers 9 and 10 relative to one another, on the plug-on body 1 the cam carrier dampers 8 are disposed according to the invention. These dampen especially preferably the impact of the cam carriers 9 and 10 on one another at the end of their turning movement. The cam carrier dampers can however also already exert a damping effect via a corresponding friction closure onto at least one of the cam carriers 9 or 10 before this end position is reached.

In the depicted embodiment example the clamping bolt 2 is supported shiftably in its longitudinal direction relative to the plug-on body 1 as well as also rotatably in its circumferential direction 17 in the opening 4 of the plug-on body 1. In order to delimit specifically a stroke of the plug-on body 1 during the closing and/or opening of the securement device, the plug-on body 1 in the depicted embodiment example comprises additionally also the stroke end stop 13 which here in this embodiment example is developed as a portion of a resilient tongue 14.

In the elongated hole 7 of the side jaw 29 opposite the manual operating lever 35 is located an accessory plug-on body 32. Like the plug-on body 1, it comprises corresponding elongated hole end stops 5 and guidance faces 11 as well as also a stroke end stop 13, the functions of which are the same as in the plug-on body 1 according to the invention. However, this accessory plug-on body 32 does not comprise a cam carrier damper 8 since there are no cam carriers 9, 10 on this side of the securement device.

Before the plug-on body 1 according to the invention of this embodiment example is discussed once again in greater detail in conjunction with the subsequent Figures, reference is made also that, instead of the manual operating lever 35, a motor drive known per se can also be provided for turning the clamping bolt 2. Moreover, it is understood that embodiment examples of the invention are also conceivable in which the clamping bolt is at rest and one of the cam carriers 9 or 10 is turned relative to the clamping bolt in the circumferential direction 17. Fundamentally, plug-on bodies according to the invention can be employed in all suitable, friction- and/or form-closure securement devices known per se. The side jaws 29 and the intermediate leverage 23 or the steering spindle bearing unit 24 can also comprise elongated holes 7 intersecting one another in which the clamping bolt is guided by means of plug-on bodies 1 according to the invention. Such plug-on bodies 1 can in this case, like the prior art described in the introduction, comprise elongated hole end stops 5 for the ends of both intersecting elongated holes 7. It is understood that simplified implementations of steering columns 3 according to the invention are also feasible in which a displacement of the steering spindle 25 together with the steering wheel adapter 26 is either only possible in the height directions 27 or only in the length directions 28.

In FIGS. 2 and 3 the plug-on body 1 and the clamping bolt 2 are shown detached from the other structural components of the adjustable steering column 3. In FIGS. 4 to 9 only the plug-on body 1 implemented according to the invention of this embodiment example is depicted. FIG. 4 shows a perspective view, FIG. 5 a front view, FIG. 6 a side view, FIG. 7 a top view, FIG. 8 a longitudinal section through FIG. 6, and FIG. 9 a horizontal section through FIG. 7. In these depictions can especially well be seen that the plug-on body 1 comprises a type of sleeve 36 which sheathes the opening 4 through which the clamping bolt 2 can be plugged. The guidance faces 11 serve for the low-noise guidance of the plug-on body 1 along the side walls 12 of the elongated holes 7. The damped elongated hole end stops 5 avoid noise development when the plug-on body 1 impacts on one of the ends 6 of the elongated holes 7. In the depicted embodiment example the elongated hole end stops 5 are developed in the form of partially relief-clearanced resilient tongues. The freely protruding ends of these resilient tongues are supported in this embodiment example on softer damping bodies 37 which can be developed, for example, of softer elastomer. As illustrated in FIG. 11, it is alternatively conceivable and feasible not to integrate the damping body 37 into the plug-on body 1, but rather to implement between the elongated hole end stop 5 and opening 4 a relief-clearance 39 in the plug-on body 1. This relief-clearance 39 enables good elastic deformation of the elongated hole end stop 5 into the space of the relief-clearance 39. The elongated hole end stop 5 can herein be reinforced through suitable measures and laid out to be durable. The cam carrier dampers 8 serve for damping the turning movement between cam carriers 9 and 10 as is shown once again below in detail in conjunction with FIG. 10. By means of detents 15 this embodiment example of the plug-on body 1 can be fixed on the further cam carrier 10 of the steering column 3 depicted in FIG. 1. The stroke end stop 13 serves for the stroke delimitation of the plug-on body 1 in the longitudinal directions 16 of the clamping bolt 2. In the depicted embodiment example the stroke end stop is developed on a resilient tongue 14 of the plug-on body 1. In FIG. 10 once again, detached from the other structural components of the adjustable steering column 3, is illustrated the cooperation according to the invention of the plug-on body 1 by means of its cam carrier dampers 8 with the cam carriers 9 and 10 during their turning movement. The further cam carrier 10, onto which the plug-on body 1 of this embodiment example is snapped by means of the detents 15, comprises an annulus 18 which carries the cams 20 of this cam carrier 10. The cam carrier dampers 8 of the plug-on body 1 are in this embodiment example disposed within this annulus 18. They prevent in the depicted embodiment example that the cams 19 of the one cam carrier 9 during the opening turning movement, illustrated by means of arrow 38, impact directly on the cams 20 of the other cam carrier 10. The cam carrier dampers 8 act here as end stop dampers during the turning movement between the cam carriers 9 and 10 and in this function dampen a corresponding noise development when this end stop is reached. It is understood that, via a corresponding contact under friction closure between cam carrier damper 8 and cam carrier 9, a corresponding damping, and therewith suppression of noise development, can already be attained during the turning movement executed previously.

LEGEND TO THE REFERENCE NUMBERS

1 Plug-on body
2 Clamping bolt
3 Steering column
4 Opening
5 Elongated hole end stop
6 End
7 Elongated hole
8 Cam carrier damper
9 First cam carrier
10 Further cam carrier
11 Guidance face
12 Side wall
13 Stroke end stop
14 Resilient tongue
15 Detent
16 Longitudinal direction
17 Circumferential direction
18 Annulus
19 Cam
20 Cam
21 Bracket part
22 Securement plates
23 Intermediate leverage
24 Steering spindle bearing unit
25 Steering spindle
26 Steering wheel adapter
27 Height direction
28 Length direction
29 Side wall
30 Interlocking plate
31 Toothed rack
32 Accessory plug-on body 33 Nut
34 Shimming washer
35 Manual operating lever
36 Sleeve
37 Damping body
38 Arrow
39 Relief-clearance

The invention claimed is:

1. A plug-on body for a clamping bolt of an adjustable steering column for a motor vehicle, the plug-on body comprising:
 an opening for guiding the clamping bolt through the opening;
 a damped elongated hole end stop for damping an impact of the clamping bolt on an end of an elongated hole; and
 a cam carrier damper for damping a turning movement between a first cam carrier of the steering column and a further cam carrier of the steering column.

2. The plug-on body as in claim 1, further comprising a guidance face for sliding along a side wall of the elongated hole.

3. The plug-on body as in claim 1, further comprising a stroke end stop for delimiting a shifting movement of the plug-on body along the clamping bolt.

4. The plug-on body as in claim 3, wherein the stroke end stop is developed as a portion of a resilient tongue.

5. The plug-on body as in claim 1, further comprising a detent for snapping in the plug-on body on one of the cam carriers.

6. The plug-on body as in claim 1, wherein the plug-on body further comprises a synthetic material, or wherein the plug-on body is implemented with a synthetic material.

7. The plug-on body as in claim 1, wherein the plug-on body is developed unitarily as one piece.

8. An adjustable steering column for a motor vehicle, comprising:
 a clamping bolt; and
 a plug-on body as in claim 1, wherein the clamping bolt is guided through the opening of the plug-on body and the elongated hole end stop is disposed in an elongated hole of the steering column and the cam carrier damper is disposed or acts between a first cam carrier of the steering column and a further cam carrier of the steering column.

9. The adjustable steering column as in claim 8, wherein the plug-on body is supported shiftably in the longitudinal direction of the clamping bolt thereon or is supported turnably in a circumferential direction of the clamping bolt thereon.

10. The adjustable steering column as in claim 8, wherein the first cam carrier or the further cam carrier comprises cams being disposed in an annulus and cooperating with one another, and the cam carrier damper is disposed within the annulus.

* * * * *